US012802045B2

(12) United States Patent
Matsuba et al.

(10) Patent No.: US 12,802,045 B2
(45) Date of Patent: Nov. 17, 2026

(54) MAINTENANCE PLANNING SYSTEM AND MAINTENANCE PLANNING METHOD

(71) Applicant: HITACHI, LTD., Tokyo (JP)

(72) Inventors: Hiroya Matsuba, Tokyo (JP); Robert Joseph Ellis, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/866,382

(22) PCT Filed: Mar. 16, 2023

(86) PCT No.: PCT/JP2023/010429

§ 371 (c)(1),
(2) Date: Nov. 15, 2024

(87) PCT Pub. No.: WO2023/223650

PCT Pub. Date: Nov. 23, 2023

(65) Prior Publication Data

US 2025/0328872 A1 Oct. 23, 2025

(30) Foreign Application Priority Data

May 18, 2022 (JP) ................................ 2022-081414

(51) Int. Cl.
*G06Q 10/20* (2023.01)
*G06Q 10/0635* (2023.01)
*G06Q 10/0639* (2023.01)

(52) U.S. Cl.
CPC ......... *G06Q 10/20* (2013.01); *G06Q 10/0635* (2013.01); *G06Q 10/06393* (2013.01)

(58) Field of Classification Search
None
See application file for complete search history.

(56) References Cited

U.S. PATENT DOCUMENTS 9,002,691 B2 * 4/2015 Richards ................ G05B 17/02
703/7
10,109,122 B2 * 10/2018 Farahat .................. G06Q 10/06
(Continued)

FOREIGN PATENT DOCUMENTS

JP 2009-003517 A 1/2009
JP 2009-217718 A 9/2009
(Continued)

OTHER PUBLICATIONS

International Search Report, mailed May 23, 2023, for International Application No. PCT/JP2023/010429.
(Continued)

*Primary Examiner* — Arif Ullah
(74) *Attorney, Agent, or Firm* — Baker Botts L.L.P.

(57) ABSTRACT

A maintenance planning system includes a score adjustment section that adjusts a score indicating a degree of appropriateness regarding an implementation time of future maintenance of equipment based on an operation via an input device by the user, and a plan calculation section that makes maintenance planning of the equipment based on a result of adjustment by the score adjustment section. The maintenance planning system includes a risk assessment section that calculates a failure risk value based on a calculation technique selected by an operation via the input device by the user from among a plurality of calculation techniques that are candidates for calculating the failure risk value.

9 Claims, 11 Drawing Sheets

(56) References Cited

U.S. PATENT DOCUMENTS

| | | | | |
|---|---|---|---|---|
| 2011/0054965 | A1 | 3/2011 | Katagiri et al. | |
| 2013/0041705 | A1* | 2/2013 | Hampapur | G06Q 10/10 705/7.12 |
| 2014/0163936 | A1* | 6/2014 | Hosking | G06Q 10/0635 703/2 |
| 2016/0057020 | A1* | 2/2016 | Halmstad | G06F 3/0481 715/740 |
| 2017/0091688 | A1* | 3/2017 | Lopes | G06Q 10/0635 |
| 2019/0236556 | A1 | 8/2019 | Morisawa et al. | |
| 2021/0398087 | A1 | 12/2021 | Matsumoto | |
| 2022/0026879 | A1* | 1/2022 | Kale | G05B 19/4155 |

FOREIGN PATENT DOCUMENTS

| | | | |
|---|---|---|---|
| JP | 2011-048688 | A | 3/2011 |
| JP | 2021-064255 | A | 4/2021 |
| JP | 2021-196989 | A | 12/2021 |
| WO | WO 2017/110215 | A1 | 6/2017 |

OTHER PUBLICATIONS

Written Opinion, mailed May 23, 2023, for International Application No. PCT/JP2023/010429 (with English translation).

Extended European Search Report, mailed May 4, 2026, for European Application No. 23807266.4.

* cited by examiner

113a

| EQUIPMENT ID | INSTALLATION LOCATION | EQUIPMENT NAME | TECHNIQUE NAME | PREDICTION RESULT |
|---|---|---|---|---|
| Transformer 1 | SUBSTATION A | TRANSFORMER X | TIME-BASED | TABLE 1 |
| Transformer 2 | SUBSTATION A | TRANSFORMER Y | EXPONENTIAL FUNCTION | TABLE 2 |
| Switchgear 1 | SUBSTATION B | SWITCHGEAR X | EXPONENTIAL FUNCTION | TABLE 3 |
| ... | ... | | | |

114a

113b

| EQUIPMENT ID | OPTIMUM RISK VALUE | MAXIMUM RISK VALUE | MAXIMUM SCORE |
|---|---|---|---|
| Transformer 1 | 2.5 | 5.5 | 10 |
| Transformer 2 | 2.5 | 5.5 | 10 |
| Switchgear 1 | 4.5 | 6.0 | 10 |
| ... | ... | ... | ... |

FIG. 12

114b

| | |
|---|---|
| EQUIPMENT ID | Transformer 1 |
| SCORE | |
| [0.0, 0.1, 0.2, 0.2, ⋯, 0.8, 0.9, 0.95, 0.98, 1.0. 1,0, 0.97, 0.96, ⋯, 0.1, 0.0, 0.0] | |

FIG. 13

115b

| EQUIPMENT ID | MAINTENANCE TIME |
|---|---|
| Transformer 1 | FIRST WEEK OF MONTH OF YY, YEAR OF XXXX |
| Transformer 2 | FIRST WEEK OF MONTH OF YY, YEAR OF XXXX |
| Switchgear 1 | SECOND WEEK OF MONTH OF YY, YEAR OF XXXX |
| … | … |

MAINTENANCE PLANNING SYSTEM AND MAINTENANCE PLANNING METHOD

TECHNICAL FIELD

The present invention relates to a maintenance planning system and the like.

BACKGROUND ART

As a technology related to making of maintenance planning of equipment, there is a known technology described in PTL 1, for example. That is, PTL 1 describes a maintenance planning support system including a "maintenance plan optimization means which forms a maintenance plan by calculating a maintenance timing of the component group based on failure risk information or maintenance cost information generated by the maintenance cost calculation means".

CITATION LIST

Patent Literature

PTL 1: JP 2009-217718 A

SUMMARY OF INVENTION

Technical Problem

However, the technology described in PTL 1 has a possibility that a user (customer) cannot understand what kind of policy a maintenance plan is created based on. A system with which a user can understand and accept a policy to some extent when a maintenance plan is created is desirable, but such a technology is not described in PTL 1.

Therefore, an object of the present invention is to provide a maintenance planning system or the like that can be easily accepted by the user regarding maintenance planning of equipment.

Solution to Problem

In order to solve the above problems, a maintenance planning system according to the present invention includes: a score adjustment section that adjusts a score indicating a degree of appropriateness regarding an implementation time of future maintenance of equipment based on an operation via an input means by a user; and a plan calculation section that makes maintenance planning of the equipment based on a result of adjustment by the score adjustment section.

Advantageous Effects of Invention

According to the present invention, it is possible to provide a maintenance planning system or the like that can be easily accepted by the user regarding maintenance planning of equipment.

BRIEF DESCRIPTION OF DRAWINGS

FIG. 12 is an explanatory diagram of score information of the maintenance planning system according to the embodiment.

FIG. 13 is an explanatory diagram of plan information of the maintenance planning system according to the embodiment.

DESCRIPTION OF EMBODIMENTS

Embodiment

<Configuration of Maintenance Planning System>

Figure 1:
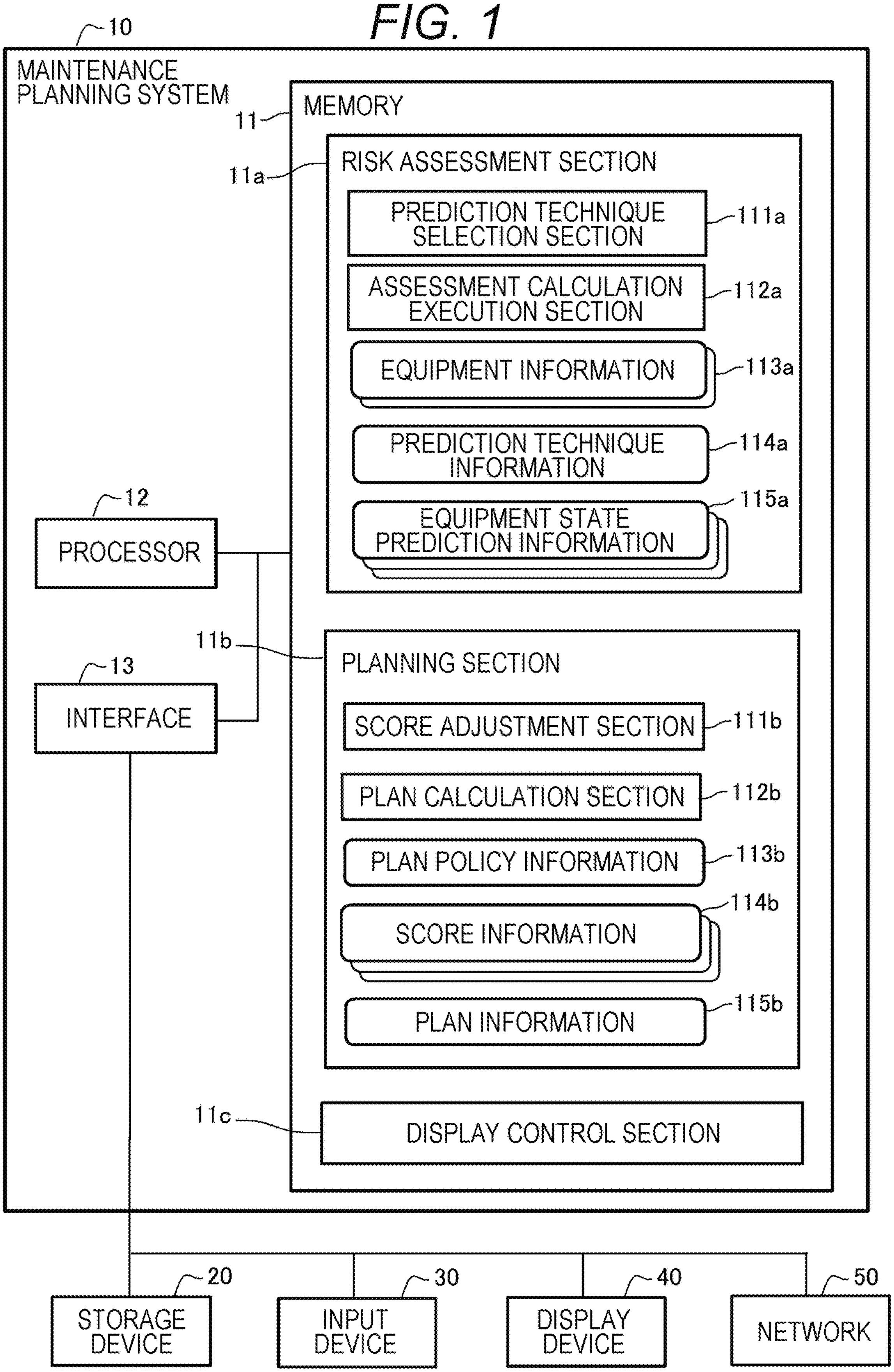
FIG. 1 is a functional block diagram illustrating a configuration of a maintenance planning system according to an embodiment.

FIG. 1 is a functional block diagram illustrating the configuration of a maintenance planning system 10 according to an embodiment.

The maintenance planning system 10 is a system that makes maintenance planning of equipment. Examples of such equipment include, but are not limited to, a power generation facility, a power transmission facility, a power distribution facility, and a substation facility. That is, the equipment to be the target of the maintenance planning system 10 may be a chemical plant, a manufacturing plant, or a water treatment plant in addition to a communication facility, an air conditioning facility, a refrigeration facility, a medical facility, a gas facility, a water facility, and a road, or may be a facility (e.g., a railway track and a cable line) related to an aircraft, a ship, or a railway vehicle in addition to them.

There are usually a plurality of (e.g., several hundred or several thousand) pieces of equipment to be the target of maintenance, and different types of equipment are often mixed. A plurality of maintenances may be performed for one piece of equipment, and one maintenance may be related to a plurality of pieces of equipment. In the following description, as an example, a case where one predetermined maintenance is performed on one piece of equipment will be described, but the present invention is not limited to this.

As illustrated in FIG. 1, the maintenance planning system 10 is connected to a storage device 20, an input device 30 (input means), and a display device 40 (display means) via wiring, and is connected also to a network 50. The storage device 20 is, for example, a hard disk drive (HDD), and stores predetermined data and programs. The input device 30 is, for example, a keyboard or a mouse operated by a user.

The display device 40 is, for example, a display. Then, a processing result of the maintenance planning system 10 is displayed on the display device 40 in a predetermined manner. Note that the display device 40 may also have a data input function as a touch display. A speaker or the like (not illustrated) that outputs a predetermined sound may be further connected.

The processing result of the maintenance planning system 10 may be transmitted to an information terminal (not illustrated) of the user via the network 50. Examples of such an information terminal include a smartphone, a mobile phone, a tablet, a personal computer, and a wearable terminal. The maintenance planning system 10 illustrated in FIG. 1 may be configured by one computer (e.g., a server), or may have a configuration in which a plurality of computers (not illustrated) are connected in a predetermined manner via a signal line or a network.

As illustrated in FIG. 1, the maintenance planning system 10 includes a memory 11, a processor 12, and an interface 13. The memory 11 is configured to include a nonvolatile memory such as a read only memory (ROM) and an HDD, and a volatile memory such as a random access memory (RAM) and a register. The memory 11 stores programs and data of a risk assessment section 11*a*, a planning section 11*b*, and a display control section 11*c*.

The processor 12 is, for example, a central processing unit (CPU), reads a program stored in the memory 11, and executes predetermined processing. The interface 13 transmits data. The interface 13 is connected to the storage device 20, the input device 30, the display device 40, and the network 50, and is connected to the memory 11 and the processor 12.

As illustrated in FIG. 1, the memory 11 stores programs and data of the risk assessment section 11*a*, the planning section 11*b*, and the display control section 11*c*. The risk assessment section 11*a* predicts a future state of equipment based on a predetermined prediction technique selected by the user. In the present embodiment, the risk assessment section 11*a* calculates a failure risk exponent (failure risk value) of the equipment as the future state of the equipment. Note that the "failure risk exponent" is a value indicating a height of possibility of occurrence of a failure (failure risk) in equipment in a case where the equipment is continuously used without performing maintenance.

As illustrated in FIG. 1, the risk assessment section 11*a* includes a prediction technique selection section 111*a*, an assessment calculation execution section 112*a*, equipment information 113*a*, prediction technique information 114*a*, and equipment state prediction information 115*a*.

The prediction technique selection section 111*a* selects a predetermined prediction technique based on an operation of the input device 30 by the user from among a plurality of prediction techniques (calculation techniques) that are candidates for predicting a future failure risk exponent of the equipment.

The assessment calculation execution section 112*a* calculates a future failure risk exponent of the equipment based on the prediction technique selected by the prediction technique selection section 111*a*.

Note that the equipment information 113*a*, the prediction technique information 114*a*, and the equipment state prediction information 115*a* will be described later.

The planning section 11*b* illustrated in FIG. 1 makes future maintenance planning of the equipment based on predetermined plan policy information 113*b*. As illustrated in FIG. 1, the planning section 11*b* includes a score adjustment section 111*b*, a plan calculation section 112*b*, the plan policy information 113*b*, score information 114*b*, and plan information 115*b*.

The score adjustment section 111*b* adjusts a score indicating a degree of appropriateness regarding a future maintenance time of the equipment based on an operation via the input device 30 (input means) by the user. The plan calculation section 112*b* makes maintenance planning of the equipment based on a result of adjustment by the score adjustment section 111*b*. Note that the plan policy information 113*b*, the score information 114*b*, and the plan information 115*b* will be described later.

The display control section 11*c* illustrated in FIG. 1 causes the display device 40 (display section) to display a predetermined setting screen regarding the maintenance planning, and causes the display device 40 to display the maintenance planning made by the planning section 11*b*.

Figure 2:
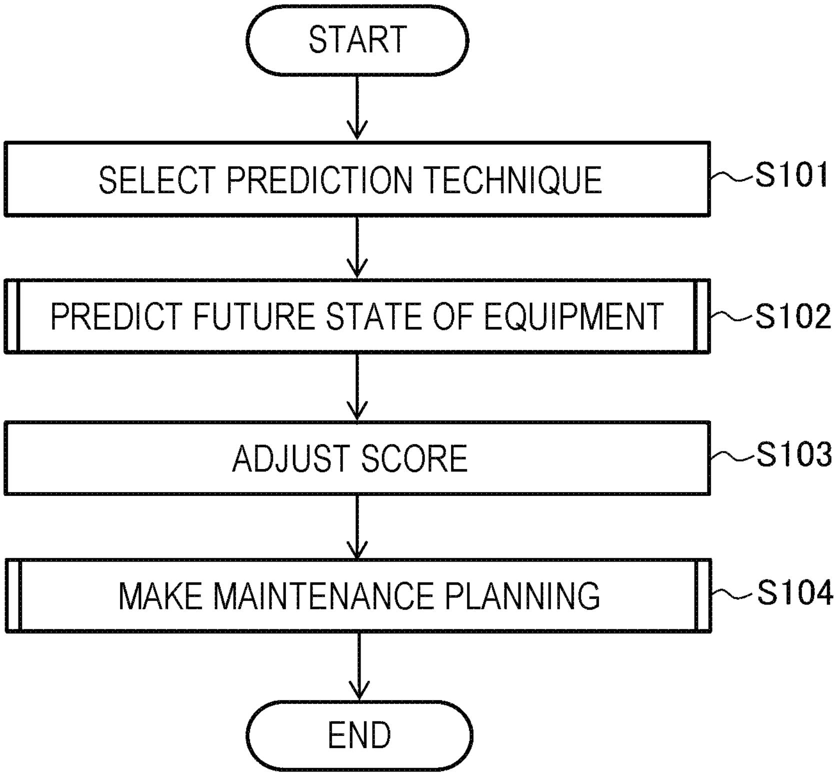
FIG. 2 is a flowchart showing processing of the maintenance planning system according to the embodiment.

FIG. 2 is a flowchart showing processing of the maintenance planning system (see also FIG. 1 as appropriate).

In step S101 shown in FIG. 2, the maintenance planning system 10 selects a prediction technique for predicting a future state of the equipment by the prediction technique selection section 111*a* based on the operation of the input device 30 by the user.

Next, in step S102, the maintenance planning system 10 predicts the future state (e.g., a failure risk exponent) of the equipment by the assessment calculation execution section 112*a*.

In step S103, the maintenance planning system 10 adjusts a score indicating appropriateness of a maintenance time of the equipment by the score adjustment section 111*b* based on the operation of the input device 30 by the user (score adjustment processing).

In step S104, the maintenance planning system 10 makes future maintenance planning of the equipment by the plan calculation section 112*b* (plan calculation processing). That is, the maintenance planning system 10 makes future maintenance planning of the equipment based on the prediction result in step S102 and the score adjusted in step S103. After performing the process of step S104, the maintenance planning system 10 ends a series of processing (END).

Next, after the equipment information 113*a* (see FIG. 1) and the prediction technique information 114*a* (see FIG. 1) are described, details of each processing of steps S101 to S104 in FIG. 2 will be described.

Figures 3, 4:
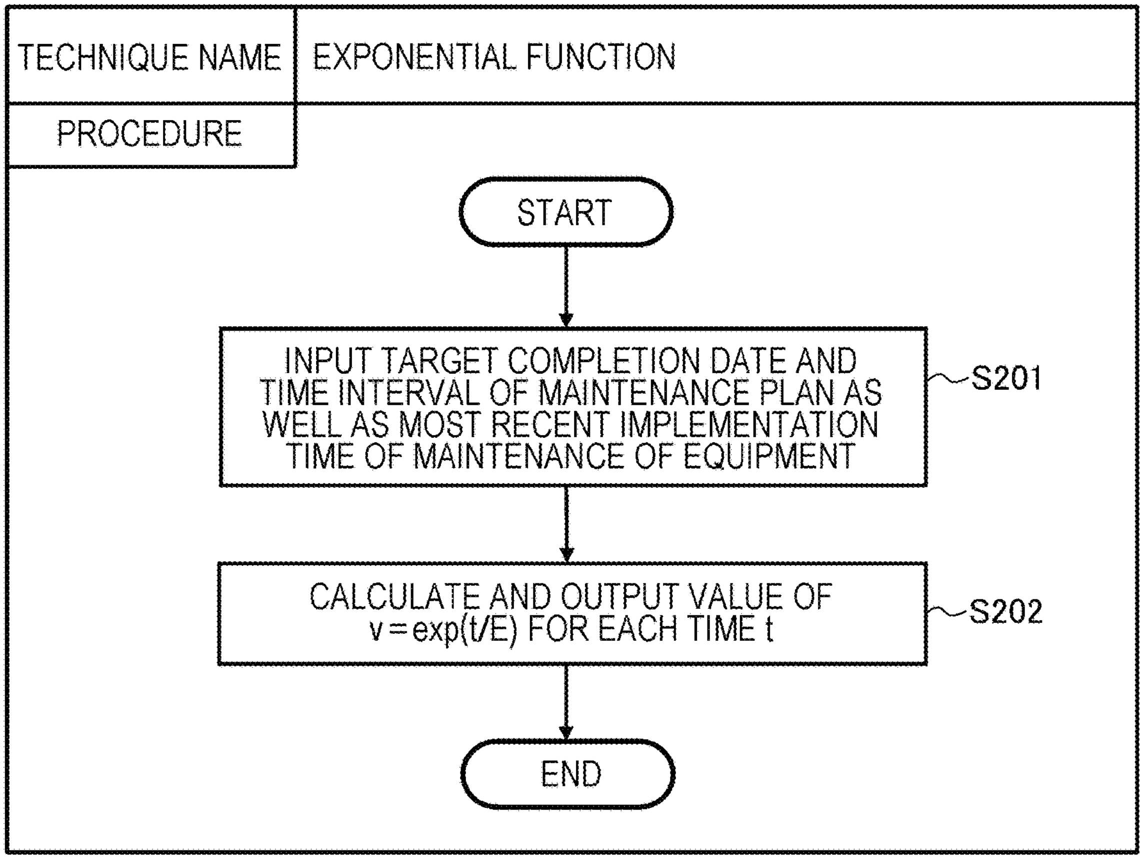
FIG. 3 is an explanatory diagram of equipment information of the maintenance planning system according to the embodiment.
FIG. 4 is an explanatory diagram of prediction technique information of the maintenance planning system according to the embodiment.

FIG. 3 is an explanatory diagram of the equipment information 113*a*.

The equipment information 113*a* illustrated in FIG. 3 is information regarding equipment to be a target of a future maintenance. In the example of FIG. 3, "equipment ID", "installation location", "equipment name", "technique name", and "prediction result" are stored in the memory 11 (see FIG. 1) as the equipment information 113*a*. The "equipment ID" illustrated in FIG. 3 is identification information allocated to each piece of equipment. The "installation location" is an installation location of the equipment, and the "equipment name" is a name of the equipment.

In the example of FIG. 3, equipment whose equipment ID is "Transformer1" and whose equipment name is "Transformer X" is installed in "Substation A". The data such as the "equipment ID", the "installation location", and the "equipment name" are provided from a user who manages the equipment, for example.

The "technique name" illustrated in FIG. 3 is a name of the prediction technique used for predicting a future state of the equipment, and is selected by an operation of the input device 30 (see FIG. 1) by the user. Note that specific prediction techniques such as "time-based" and "exponential function" will be described later. The "prediction result" illustrated in FIG. 3 is a prediction result of the future state (e.g., failure risk exponent) of the equipment based on a predetermined prediction technique selected by the user.

Although described later in detail, the prediction result of the future state of the equipment is stored in the memory 11 in the form of data table, for example, as the equipment state prediction information 115*a* (see FIG. 1). Therefore, as the "prediction result" included in the equipment information 113*a* of FIG. 3, identification information of the prediction result included in the equipment state prediction information 115*a* may be used, or an address of a storage region where the prediction result is stored may be used. For example, the prediction result of the future state of the equipment whose equipment ID is "Transformer1" is appropriately read from the memory 11 (see FIG. 1) as "Table 1" included in the equipment state prediction information 115*a* (see FIG. 1).

In the equipment information 113*a*, other data may be additionally associated with the equipment ID. For example, in addition to a maintenance ID allocated to each maintenance and data indicating a history of past maintenance (including inspection) of the equipment, data such as a detection value of a sensor (not illustrated) installed in the equipment and a command value for driving the equipment may be associated with the equipment ID.

FIG. 4 is an explanatory diagram of the prediction technique information 114*a*.

The prediction technique information 114*a* is data indicating a prediction technique of the future state of the equipment, and is stored in advance in the memory 11 (see FIG. 1). The "technique name" illustrated in FIG. 4 is a name of a technique used for predicting the future state of the equipment. FIG. 4 illustrates an example in which an exponential function is used as one prediction technique. Then, a plurality of prediction techniques such as an exponential function are stored in advance in the memory 11 (see FIG. 1) as the prediction technique information 114*a*, and the prediction technique is appropriately selected by the operation of the input device 30 (see FIG. 1) by the user.

In the present embodiment, the risk assessment section 11*a* (see FIG. 1) calculates a failure risk exponent as a future state of the equipment. As described above, the "failure risk exponent" is a value indicating the height of a future failure risk of the equipment. The exponential function, which is one of the prediction technique of the state of equipment, is used in a case where it is known that the failure risk exponent monotonically increases with the lapse of time, for example.

A "procedure" illustrated in FIG. 4 is a procedure for predicting the future state of the equipment, and is associated with the "technique name". That is, as the "procedure" in a case where the prediction technique of an "exponential function" is used, for example, a program of the following processing is stored in advance in the memory 11 (see FIG. 1). In the example of FIG. 4, in step S201, the risk assessment section 11*a* (see FIG. 1) receives, as inputs, a target completion date and a time interval of the maintenance plan as well as most recent implementation time of maintenance of the equipment. For example, in a case where the failure risk exponent of the equipment is calculated for each calendar date of one year from the most recent maintenance of the equipment, the user operates the input device 30 (see FIG. 1) in a predetermined manner and sets as follows. That is, the user inputs the calendar date of the most recent maintenance (or the number of elapsed days from the most recent maintenance to the current time point) and the calendar date of the target completion date of the maintenance plan, and sets the time interval to one day.

Next, in step S202, the risk assessment section 11*a* (see FIG. 1) calculates v=exp(t/E) for each time t, and outputs the result. Note that "v" included in the above formula is a failure risk exponent of the equipment, and "E" is a length of a period from the most recent maintenance implementation time to the target completion date of the maintenance plan. The risk assessment section 11*a* (see FIG. 1) calculates, as a failure risk exponent, a value of v=exp(t/E) at each time t when the period from the most recent maintenance implementation time to the target completion date of the maintenance plan is equally divided at a predetermined time interval (the time interval input in S101), and causes the display device 40 (see FIG. 1) to display the result.

Note that the prediction technique for predicting the future state of the equipment is not limited to the "exponential function" illustrated in FIG. 4. As another prediction technique, for example, "time-based", "standard model-based", or "data-driven" may be used.

"Time-based", which is one of the prediction techniques, is a technique of predicting a state of the equipment based on specifications by the manufacturer of the equipment and a regulation of a national or local public organization. It is assumed that maintenance of the equipment every year is recommended in the specifications of the manufacturer of the equipment. In such a case, the failure risk exponent may be increased stepwise after one year elapses from the most recent maintenance. For example, even in a case where the user does not have data of a past maintenance history of the equipment, the future state of the equipment can be predicted by using the "time-based" as the prediction technique.

The "standard model-based", which is another prediction technique, is a technique of calculating the failure risk exponent based on the result of the most recent maintenance (including inspection) of the equipment. In a case where data of most recent maintenance of the equipment exists, the user can select "standard model-based" as a prediction technique.

The "data-driven", which is another prediction technique, is a technique of calculating the failure risk exponent based on the maintenance history or the like performed in the past regarding the equipment. In addition, a detection value of each sensor (not illustrated) when the equipment is driven and a command value when the equipment is controlled may be appropriately used for the "data-driven". In the case of including the past maintenance history data of the equipment, the user can select the "data-driven" as the prediction technique. A plurality of such prediction techniques are stored in advance in the memory FIG. 1) as the prediction technique information 114*a*.

As described above, the prediction technique selection section 111*a* illustrated in FIG. 1 selects a predetermined prediction technique based on the operation of the input device 30 by the user from among the plurality of prediction techniques that are candidates for predicting the future state of the equipment.

Figure 5:
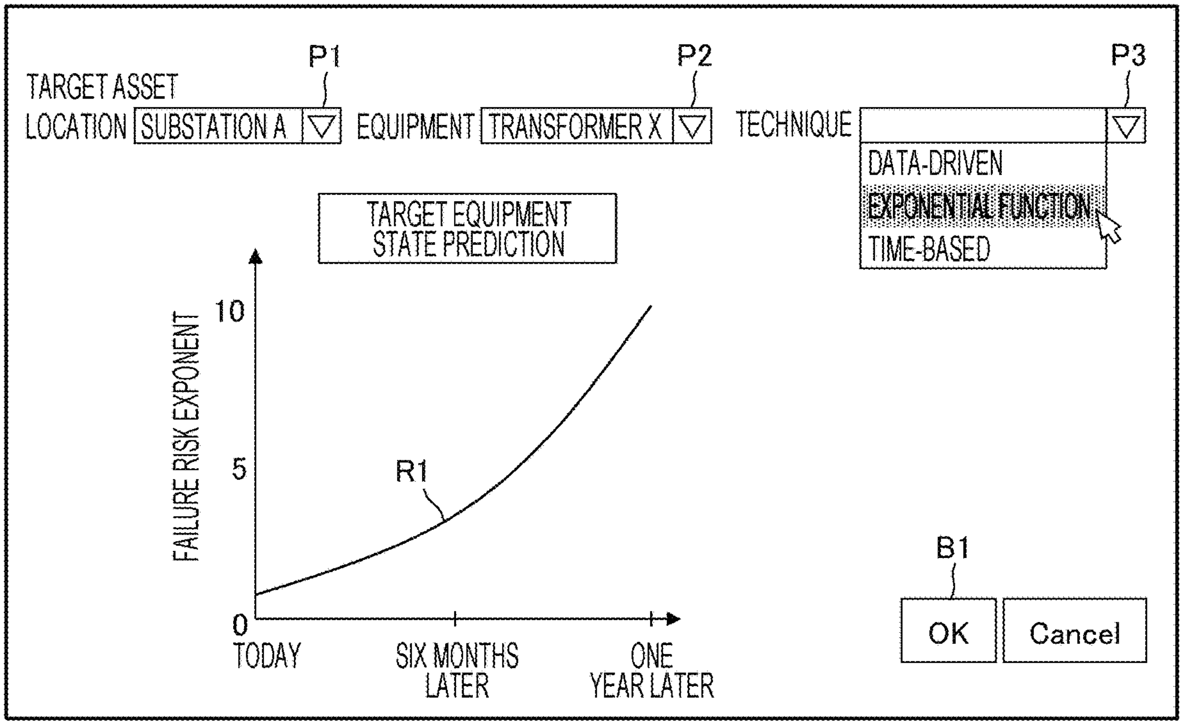
FIG. 5 is a display screen example regarding processing of a prediction technique selection section of the maintenance planning system according to the embodiment.

FIG. 5 is a display screen example regarding processing of the prediction technique selection section.

In the example of FIG. 5, the candidates of "location", "equipment", and "technique" of the target equipment of maintenance (target asset) are displayed on the display device 40 (see FIG. 1) as predetermined pull-down menus P1, P2, and P3. In the example of FIG. 5, "Substation A" is selected as the "location" of the equipment, and "Transformer X" is selected as the name of the "equipment". As a prediction technique for predicting the future state of "Transformer X" installed in "Substation A", "exponential function" is selected.

In this manner, the prediction technique selection section 111*a* (see FIG. 1) selects a predetermined prediction technique from the pull-down menu P3 (corresponding to S101 of FIG. 2) in response to the operation of the input device 30 (see FIG. 1) by the user. Note that since it is sufficient to specify equipment to be a target of maintenance, selection of the installation location and the name of the equipment is not particularly essential processing. For example, the user may select (or directly input) the equipment ID of the equipment to be the target of maintenance.

When a button B1 of "OK" in FIG. 5 is selected, for example, a curve R1 indicating transition of the failure risk exponent from "today" to "one year later" is displayed as the "target equipment state prediction". Note that the horizontal axis of the coordinate of the curve R1 illustrated in FIG. 5 represents the elapsed time from the time of making the maintenance planning (today), and the vertical axis represents the future failure risk exponent of the equipment to be the target of maintenance.

Note that FIG. 5 illustrates a display screen example regarding predetermined one piece of equipment, but a prediction technique is selected for each of a plurality of pieces of equipment (e.g., hundreds or thousands of equipment) to be the target of maintenance. As described above, the user himself/herself can select the prediction technique based on what data the user owns. As illustrated in FIG. 3, the prediction technique selected by the user is associated with the equipment ID (or the maintenance ID) and stored in the memory 11 (see FIG. 1) as the equipment information 113*a*.

The assessment calculation execution section 112*a* illustrated in FIG. 1 calculates a future state (e.g., each value of the curve R1 illustrated in FIG. 5) to be the target of maintenance. Such processing of the assessment calculation execution section 112*a* will be described with reference to FIG. 6.

Figure 6:
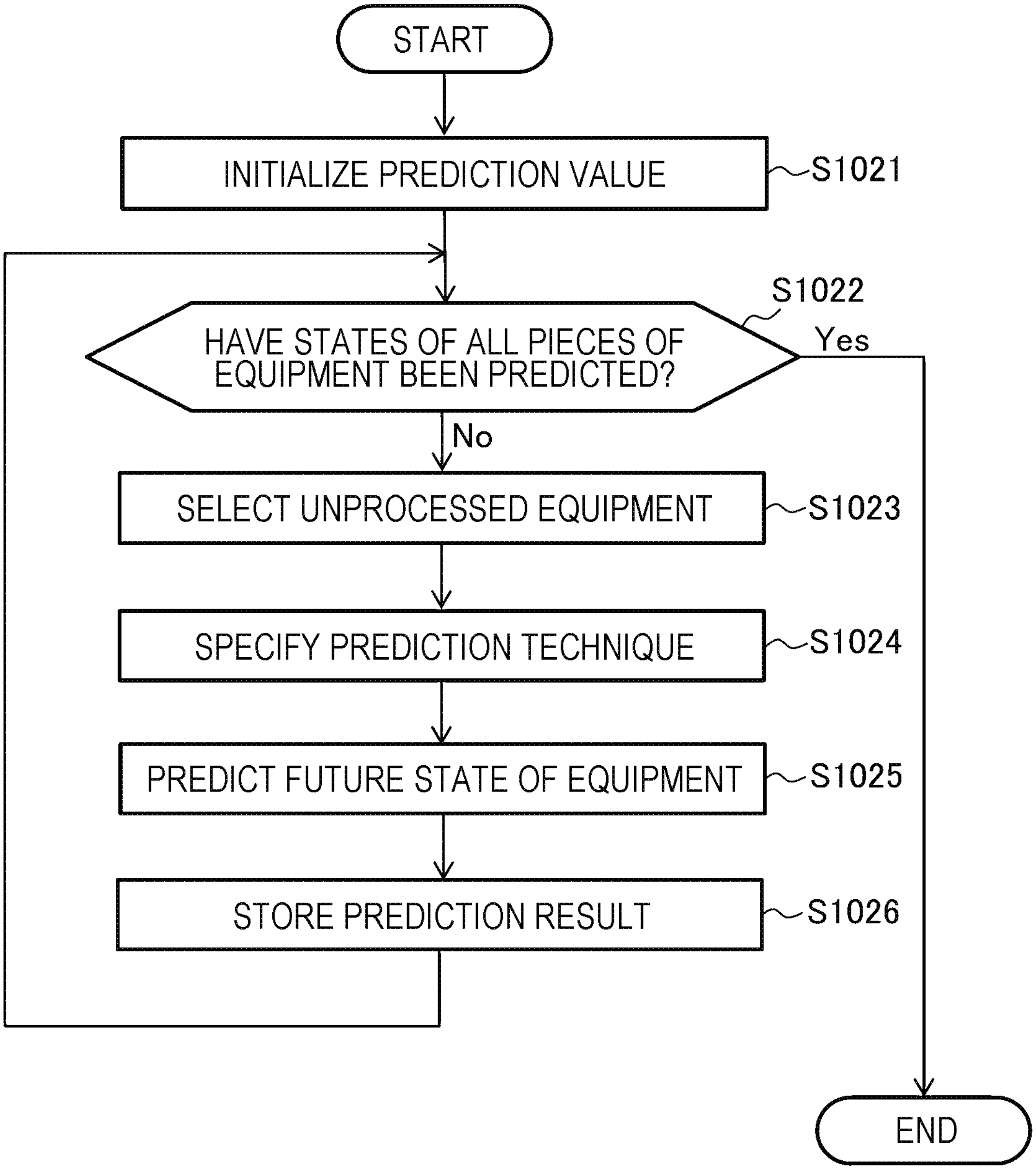
FIG. 6 is a flowchart showing processing of an assessment calculation execution section of the maintenance planning system according to the embodiment.

FIG. 6 is a flowchart showing processing of the assessment calculation execution section.

Note that the series of processing shown in FIG. 6 corresponds to the processing of step S102 in FIG. 2 (prediction of the future state of the equipment). It is assumed that at the time of "START" in FIG. 6, a prediction technique for predicting the future state is selected for each piece of equipment to be the target of maintenance, and is stored in the memory 11 (see FIG. 1) as the equipment information 113*a* (see FIG. 3).

In step S1021, the assessment calculation execution section 112*a* initializes a prediction value regarding the state of the equipment (e.g., the failure risk exponent). For example, the assessment calculation execution section 112*a* initializes, to a predetermined value, a value in each field of the prediction result associated with the equipment ID in FIG. 3.

In step S1022, the assessment calculation execution section 112*a* determines whether or not the states of all pieces of equipment have been predicted. That is, the assessment calculation execution section 112*a* determines whether or not the failure risk exponents have been calculated for all pieces of equipment (or all maintenances) included in the equipment information 113*a* (see FIG. 3). In step S1022, if there is equipment whose state has not been predicted (S1022: No), the processing of the assessment calculation execution section 112*a* proceeds to step S1023.

In step S1023, the assessment calculation execution section 112*a* selects unprocessed equipment. That is, the assessment calculation execution section 112*a* selects equipment whose failure risk exponent has not been calculated yet.

In step S1024, the assessment calculation execution section 112*a* specifies a prediction technique. That is, the assessment calculation execution section 112*a* reads data of a technique name from the prediction technique information 114*a* (see FIG. 1) based on the technique name (see FIG. 3) corresponding to the equipment selected in step S1023. For example, when predicting the failure risk exponent of the equipment whose equipment ID is "Transformer1" in the equipment information 113*a* illustrated in FIG. 3, the assessment calculation execution section 112*a* reads data of the "exponential function" from the prediction technique information 114*a* (see FIG. 4) based on the "exponential function" of the technique name.

Next, in step S1025, the assessment calculation execution section 112*a* predicts the future state of the equipment. That is, the assessment calculation execution section 112*a* calculates the failure risk exponent at each future time of the equipment based on the prediction technique specified in step S1024. In this manner, the assessment calculation execution section 112*a* (i.e., the risk assessment section 11*a*: see FIG. 1) calculates the failure risk exponent based on the prediction technique selected by the operation via the input device 30 (input means: see FIG. 1) by the user from among a plurality of prediction techniques (calculation techniques) that are candidates for calculating the failure risk exponent (failure risk value) of the equipment.

In step S1026, the assessment calculation execution section 112*a* stores a prediction result of the future state of the equipment. Specifically, the assessment calculation execution section 112*a* stores the prediction result of step S1025 in the memory 11 (see FIG. 1) as the equipment state prediction information 115*a* (see FIG. 1). In addition, the identification information of the prediction result included in the equipment state prediction information 115*a* may be stored as the "prediction result" included in the equipment information 113*a* (see FIG. 3).

After the processing of step S1026 is performed, the processing of the assessment calculation execution section 112*a* returns to step S1022. If the states of all pieces of equipment have been predicted in step S1022 (S1022: Yes), the assessment calculation execution section 112*a* ends the series of processing shown in FIG. 6 (END).

The equipment state prediction information 115*a* illustrated in FIG. 1 is information regarding the prediction result of the future state of each piece of equipment. That is, the data generated by the series of processing in FIG. 6 is the equipment state prediction information 115*a*. The equipment state prediction information 115*a* includes a value of a failure risk exponent in each future period (e.g., each calendar date from the current time point to one year later).

Next, score adjustment based on operation by the user will be described with reference to FIG. 7.

Figure 7:
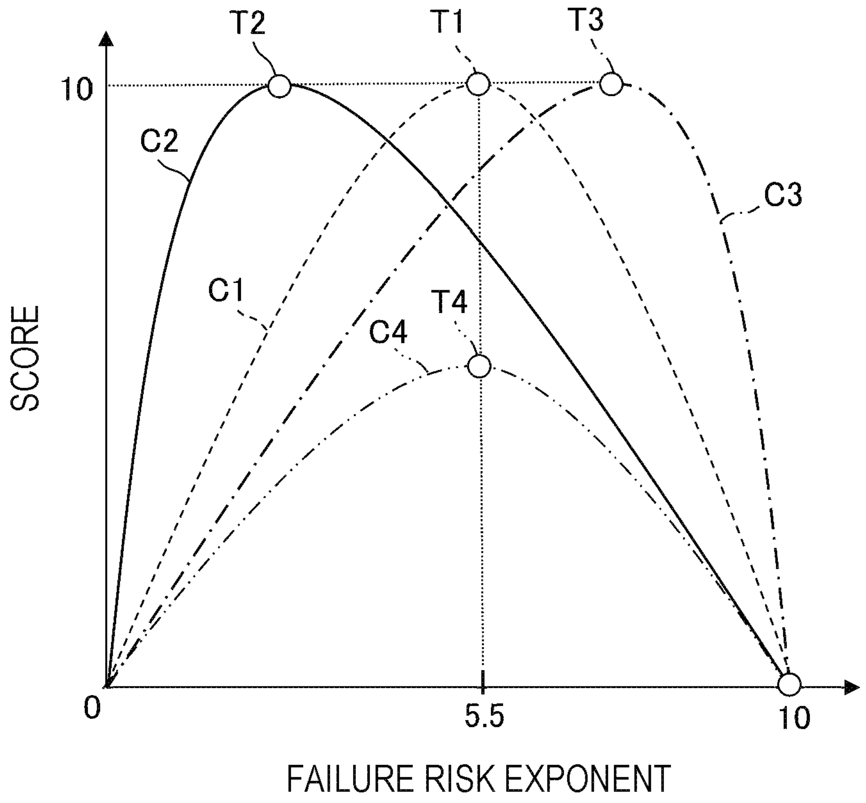
FIG. 7 is an explanatory diagram regarding score adjustment in the maintenance planning system according to the embodiment.

FIG. 7 is an explanatory diagram regarding score adjustment.

The horizontal axis in FIG. 7 represents the failure risk exponent of predetermined equipment. The vertical axis in FIG. 7 represents a score indicating the degree of appropriateness of the future maintenance time of the equipment. A curve C1 indicated by a broken line in FIG. 7 is a graph of predetermined function that is initially set. For example, in a case where a point specified by a value X of the failure risk exponent on the horizontal axis and a value Y of the score on the vertical axis is expressed as (X, Y), the curve C1 is initially set as a curve that is convex upward from a point (0, 0) to a point (10, 0). In the example of FIG. 7, a point (5.5, 10) is a vertex T1 of the curve C1.

As described above, the later the maintenance time of the equipment is, the higher the failure risk exponent is in many cases. For example, in a case where the maintenance of the equipment is performed at a very early time when the failure risk exponent is substantially zero, there is almost no risk that the equipment will fail before the maintenance is started, but the cost required for the maintenance increases, and therefore the degree of appropriateness of the maintenance time (i.e., score) is low. Therefore, in the curve C1 of FIG. 7, the score is set so as to approach zero as the failure risk exponent approaches zero near the origin.

On the other hand, in a case where the maintenance of the equipment is performed at a time (considerably late time) when the value of the failure risk exponent is close to "10", the cost required for the maintenance decreases, but the risk that the equipment will fail before the maintenance is started increases, and therefore the degree of appropriateness of the maintenance time (i.e., score) is low. Therefore, in the curve C1 of FIG. 7, the score is set so as to approach zero as the failure risk exponent approaches "10".

Note that the concept regarding the maintenance implementation time varies depending on the user. For example, some users desire to reduce the risk of failure of the equipment even if the cost of maintenance of the equipment increases. Some users desire to minimize the cost of maintenance of the equipment as much as possible because there is not much room in terms of funds.

Maintenance plans have been uniformly made so far with no user intervening in the process of making the maintenance planning on the system side. In the case where a uniform maintenance plan is presented to the user in this manner, there is a possibility that the user cannot understand on what kind of concept (policy) the maintenance planning is made based, regarding the failure risk and the cost of the equipment. As a result, there is a possibility for the user to less likely to accept the content of the maintenance planning.

Therefore, in the present embodiment, the display control section 11*c* (see FIG. 1) causes the display device 40 (display means) to display the predetermined curve C1 or the like indicating the relationship between the failure risk exponent (failure risk value) indicating the height of a future failure risk of the equipment and the score. This enables the user to visually understand the concept regarding maintenance. Then, the position and shape of the curve C1 are changed based on the operation of the user so that the user's concept regarding the implementation time and cost of the maintenance is reflected, and the plan calculation section 112*b* (see FIG. 1) makes the maintenance planning based on the curve after change. This makes it easier for the user to understand and accept the maintenance plan.

For example, it is assumed that the user who looks at the curve C1 (standard concept) that is initial setting desires to create a maintenance plan that further reduces the risk of failure of the equipment. In such a case, the user operates the input device 30 (see FIG. 1) in a predetermined manner, and changes, for example, the curve C1 in the broken line to a curve C2 in a solid line. Specifically, when the user operates the input device 30, selects the vertex T1 of the curve C1, and slides the position of the vertex in the lateral direction, for example, the curve C2 that is new as a vertex T2 is displayed. The curve C2 that is convex upward has a lower failure risk exponent at the vertex T2 than that of the curve C1 of the initial setting. That is, the curve C2 reflects the user's concept of desiring to reduce the risk of failure of the equipment.

It is assumed that the user who looks at the curve C1 (standard concept) that is initial setting desires to create a maintenance plan in which the maintenance cost of the equipment is suppressed. In such a case, the user operates the input device 30 in a predetermined manner, and changes, for example, the curve C1 in the broken line to a curve C3 in a one-dot chain line. The curve C3 that is convex upward has a higher r failure risk exponent at a vertex T3 than that of the curve C1 of the initial setting. That is, the curve C3 reflects the user's concept of desiring to reduce the cost by performing maintenance of the equipment at a relatively late time.

It is assumed that the user who looks at the curve C1 (standard concept) that is initial setting thinks that the maintenance time is not so important for the predetermined equipment to be the target. That is, it is assumed that the user thinks that the maintenance time of the predetermined equipment may be early or there is no problem even if it is late. In such a case, the user operates the input device 30 in a predetermined manner, and changes, for example, the curve C1 in the broken line to a curve C4 in a two-dot chain line. In the curve C4 that is convex upward, the score of a vertex T4 is lower than the standard. That is, the curve C4 reflects the user's concept of not particularly caring about the implementation time of maintenance of the predetermined equipment.

In this manner, each of the curves C2, C3, and C4 indicates a rough concept of the user regarding the implementation time and cost of the maintenance of the equipment. These curves C2, C3, and C4 are curves that are convex upward similarly to the curve C1 of the initial setting, and are set to pass through the origin (0, 0).

In addition, the user may be allowed to change the coordinates of the point (10, 0) having the maximum failure risk exponent on the curve C1 that is convex upward. For example, in a case where a major problem does not particularly occur even in a case where predetermined equipment fails, the user operates the input device 30 (see FIG. 1) in a predetermined manner to lower the maximum value (failure risk exponent at a point that is an end point of the curve and different from the origin) of the failure risk exponent.

Note that different curves may be mixed for a plurality of pieces of equipment, such as the curve C2 is set for predetermined equipment and the curve C3 is set for another piece of equipment. A predetermined function corresponding to each of such curves is associated with respective piece of equipment (or maintenance) and stored in the memory 11 (see FIG. 1) as the plan policy information 113*b* (see FIG. 1).

Figures 8, 9:
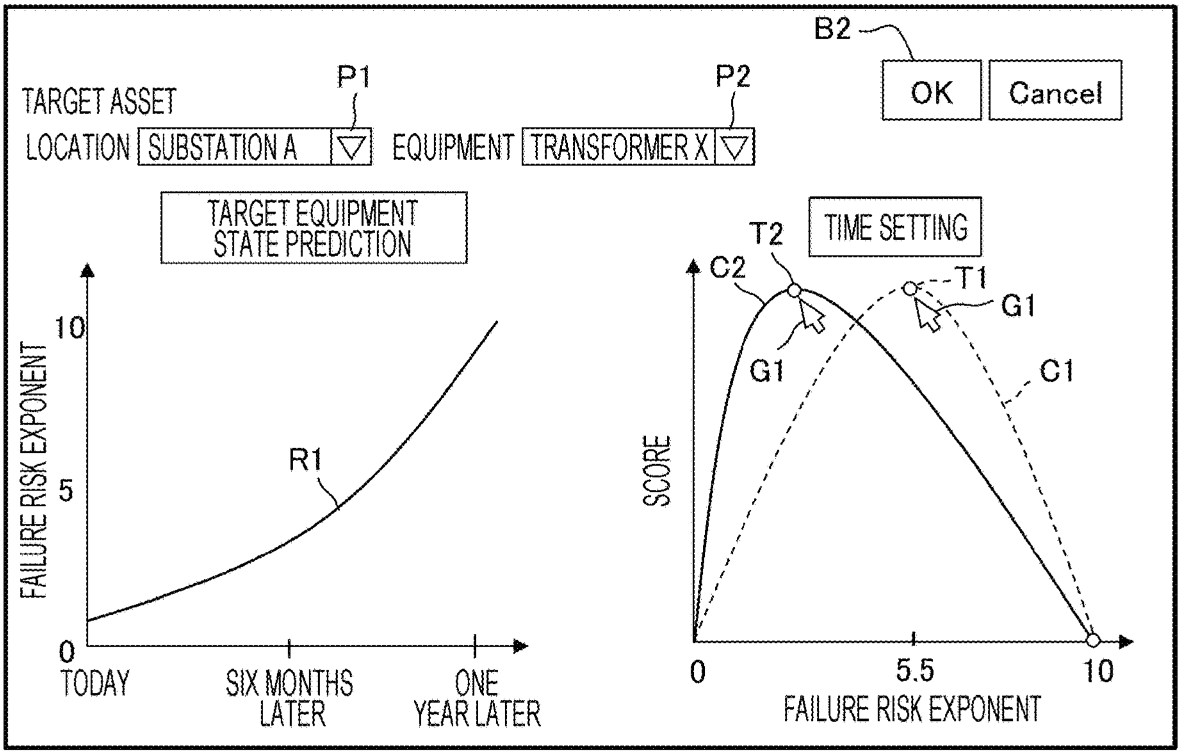
FIG. 8 is an explanatory diagram of plan policy information of the maintenance planning system according to the embodiment.
FIG. 9 is a screen display example regarding score adjustment and the like in the maintenance planning system according to the embodiment.

FIG. 8 is an explanatory diagram of the plan policy information 113*b*.

An "optimum risk value" illustrated in FIG. 8 is a failure risk exponent of a point whose score is highest in the curve indicating the relationship between the failure risk exponent of the equipment and the score. With the curve C1 illustrated in FIG. 7 being described as an example, the value "5.5" of the failure risk exponent at the vertex T1 of this curve C1 is the "optimum risk value".

A "maximum risk value" illustrated in FIG. 8 is the maximum value of the failure risk exponent in the curve indicating the relationship between the failure risk exponent of the equipment and the score. With the curve C1 illustrated in FIG. 7 being described as an example, the failure risk exponent "10" at a point (10, 0), which is one end point of this curve C1, is the "maximum risk value".

The "maximum score" illustrated in FIG. 8 is the maximum value of the score in the curve indicating the relationship between the failure risk exponent of the equipment and the score. With the curve C1 illustrated in FIG. 7 being described as an example, the score value "10" at the vertex T1 of this curve C1 is the "maximum score". The position and shape of the curve (e.g., the curve C1 in FIG. 7) are determined by designating the "optimum risk value", the "maximum risk value", and the "maximum score" illustrated in FIG. 8.

In the example of FIG. 8, the optimum risk value of the equipment whose equipment ID is "Transformer1" is "2.5", the maximum risk value is "5.5", and the maximum score is set to "10". Note that before the curve C1 (see FIG. 7) is changed by the operation by the user, data regarding the curve C1 (see FIG. 7) that is initially set is stored as the plan policy information 113*b*. In a case where the curve is changed by the operation by the user, data regarding the curve after the change by the user is stored as the plan policy information 113*b*.

Note that the processing of reflecting the operation of the input device 30 by the user into the change of the curve C1 and the like (see FIG. 7) is performed by the score adjustment section 111*b* (see FIG. 1). That is, the score adjustment section 111*b* changes the predetermined curve indicating the relationship between the failure risk exponent (failure risk value) and the score based on the operation by the user through the input device 30 (input means).

FIG. 9 is a screen display example regarding score adjustment and the like.

Note that the curve R1 of the target equipment state prediction in addition to "location" (equipment location) and "device" (equipment name) illustrated in FIG. 9 is similar to that in FIG. 5. For example, in a case where the equipment is designated by the operation of the input device 30 (see FIG. 1) by the user, the curve C1 of the initial setting described above may be displayed regarding the score indicating appropriateness of the implementation time of the maintenance. The user appropriately moves a pointer G1 on the display screen to adjust the position and the like of the vertex T1 of the curve C1. Due to this, the user's own concept regarding the risk of failure of the equipment and the cost of maintenance is reflected in the curve after the adjustment. Then, the user presses a button B2 of "OK" after adjustment of the curve.

Such processing is performed for each of the plurality of pieces of equipment to be the target of maintenance. Note that since the number of pieces of equipment to be the target of maintenance may be enormous, the user may be able to collectively adjust the curve relating to the score. For example, the display control section 11*c* (see FIG. 1) may cause the setting screen to display the equipment (or maintenance) that is grouped, based on the type of equipment, the type of maintenance, or the installation location of the equipment. Then, the score regarding the equipment (or maintenance) that is grouped may be collectively adjusted based on an operation via the input device 30 (input means: see FIG. 1) by the user. This can reduce the work load of the user when making maintenance planning.

Figure 10:
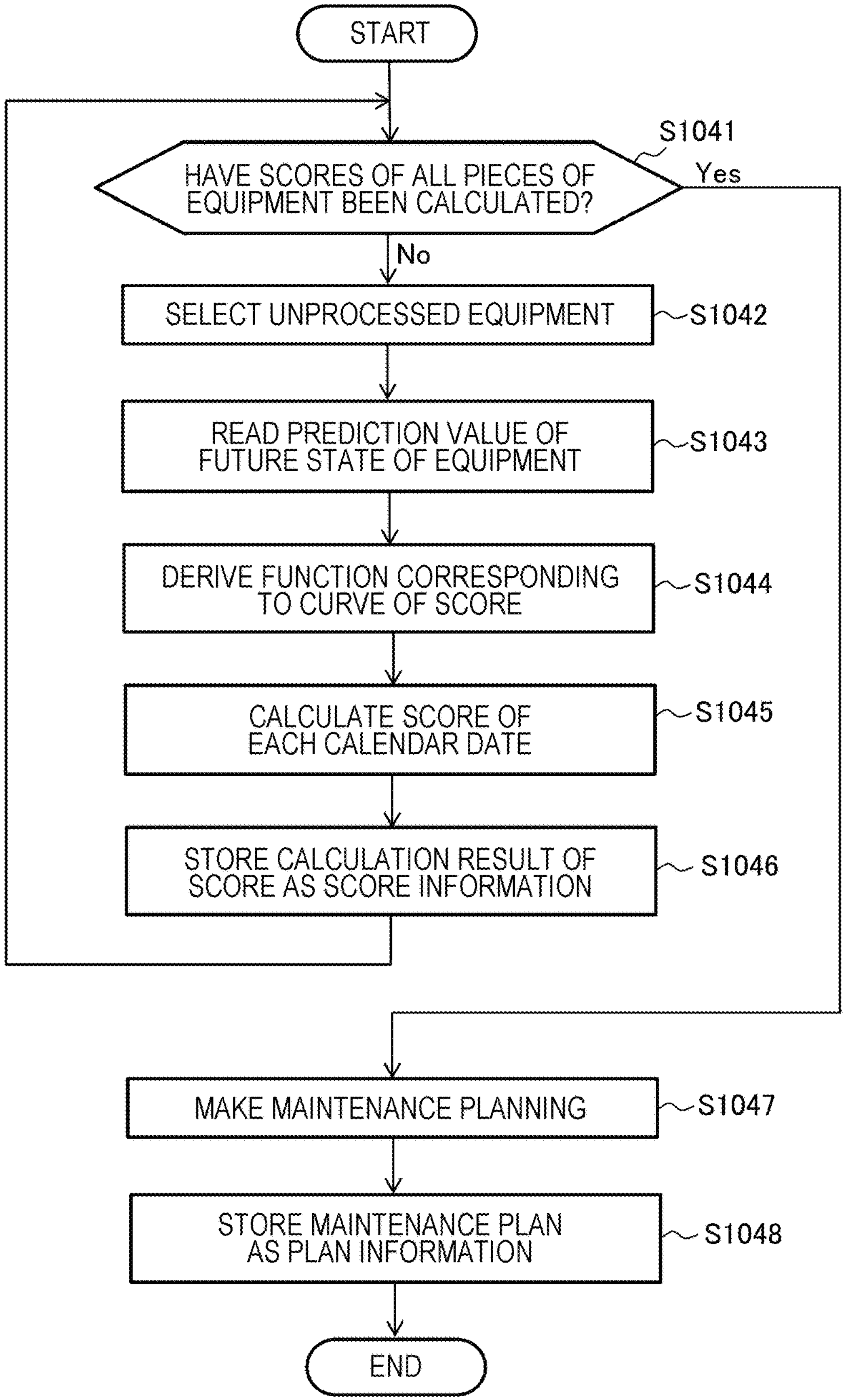
FIG. 10 is a flowchart showing processing of a plan calculation section of the maintenance planning system according to the embodiment.

FIG. 10 is a flowchart showing processing of the plan calculation section (see also FIG. 1 as appropriate).

Note that the series of processing shown in FIG. 10 corresponds to the processing of step S104 in FIG. 2 (making of maintenance planning). It is assumed that at the time of "START" in FIG. 10, a prediction result of the future state (e.g., a failure risk exponent) of each piece of equipment to be the target of maintenance is stored in the memory 11 (see FIG. 1) as the equipment state prediction information 115*a* (see FIG. 1). It is assumed that at the time of "START" in FIG. 10, the curve (see FIG. 9) of the score of each piece of equipment to be the target of maintenance is adjusted by the operation by the user and stored in the memory 11 (see FIG. 1) as the plan policy information 113*b* (see FIG. 1).

In step S1041, the plan calculation section 112*b* determines whether or not the scores of all pieces of equipment have been calculated. That is, the planning section 11*b* determines whether or not the scores at each future time have been calculated for all pieces of equipment included in the equipment information 113*a* (see FIG. 3). As described above, the "score" is a value indicating the degree of appropriateness regarding the maintenance time of the equipment. If there is equipment whose score has not been calculated in step S1041 (S1041: No), the processing of the plan calculation section 112*b* proceeds to step S1042.

In step S1042, the plan calculation section 112*b* selects unprocessed equipment. That is, the plan calculation section 112*b* selects equipment whose score has not been calculated yet.

Next, in step S1043, the plan calculation section 112*b* reads a prediction value of the future state of the equipment. That is, based on the equipment ID of the equipment selected in step S1042, the plan calculation section 112*b* refers to the equipment state prediction information 115*a*, and reads a function indicating transition of the failure risk exponent of the equipment.

In step S1044, the plan calculation section 112*b* derives a function corresponding to the curve of the score. That is, the plan calculation section 112*b* refers to the plan policy information 113*b* (see FIG. 8) based on the equipment ID of the equipment selected in step S1042, and derives a function of the curve (e.g., the curve C2 in FIG. 7) of the score after adjustment by the user based on the optimum risk value, the maximum risk value, and the maximum score of the equipment.

In step S1045, the plan calculation section 112*b* calculates the score for each future calendar date. The processing in step S1045 will be described with reference to FIG. 11.

Figure 11:
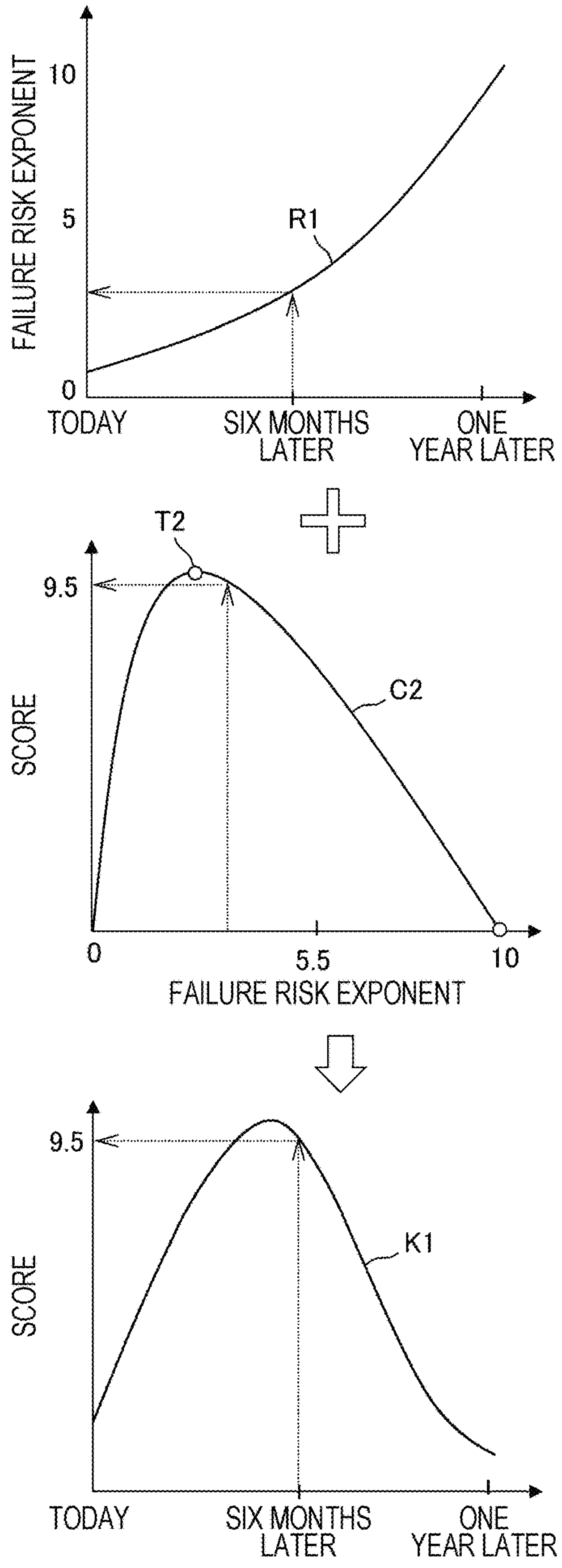
FIG. 11 is an explanatory diagram regarding derivation of a score for each future calendar date in the maintenance planning system according to the embodiment.

FIG. 11 is an explanatory diagram regarding derivation of a score for each future calendar date.

The curve R1 indicating the transition of the failure risk exponent of predetermined equipment is illustrated on the upper side of the sheet of FIG. 11. This curve R1 indicates the relationship between the number of elapsed days from the current time point, for example, and the failure risk exponent, and is created based on the prediction technique (see FIG. 5) selected by the user as described above. The data regarding the curve R1 is stored in the memory 11 (see FIG. 1) as the equipment state prediction information 115*a* (see FIG. 1) in association with the equipment ID.

The curve C2 indicating the relationship between the failure risk exponent and the score of predetermined equipment is illustrated in the middle of the sheet of FIG. 11. As described above, the curve C2 is adjusted by the operation of the input device 30 (see FIG. 1) by the user (see FIG. 7). The data regarding the curve C2 is stored in the memory 11 (see FIG. 1) as the plan policy information 113*b* (see FIG. 8) in association with the equipment ID.

In step S1045 of FIG. 10, the plan calculation section 112*b* calculates each value of a curve K1 indicating the transition of the future score based on the curve R1 (upper side of the sheet of FIG. 11) indicating the future state (failure risk exponent) of the equipment and the curve C2

(middle of the sheet of FIG. 10) regarding the score of the equipment. For example, when calculating a score six months later from the current time point, the plan calculation section 112*b* first calculates a value of the failure risk exponent after six months based on a predetermined function represented by the curve R1 of the failure risk exponent. Then, the plan calculation section 112*b* calculates a score corresponding to the value of this failure risk exponent based on the function of the curve C2. Thus, the score of six months later is calculated. In the example of FIG. 11, the value of the score in a case of performing maintenance of the equipment six months later is "9.5". By performing such processing for each calendar date from "today" to "one year later", the plan calculation section 112*b* calculates each value of the curve K1 on the lower side of the sheet of FIG. 11.

In this manner, the plan calculation section 112*b* calculates the failure risk exponent (failure risk value) corresponding to the elapsed time from the predetermined reference time, and further calculates the score corresponding to the failure risk exponent based on the predetermined curve C2 indicating the relationship between the failure risk exponent and the score.

In other words, a predetermined "third function" (corresponding to the curve K1) is derived as a composite function of a "first function" (corresponding to the curve R1) indicating the relationship between the elapsed time from the predetermined reference time and the failure risk exponent (failure risk value) and a "second function" (corresponding to the curve C2) indicating the relationship between the failure risk exponent and the score. Here, the "third function" is a function indicating the relationship between the elapsed time from a predetermined reference time and the score. The predetermined reference time described above is, for example, the time of making maintenance planning or the time of ending the most recent maintenance.

After calculating the score of each future calendar date in step S1045 of FIG. 10, the plan calculation section 112*b* stores the calculation result of the score as the score information 114*b* in step S1046. That is, the plan calculation section 112*b* stores the score of each future calendar date (data of the curve K1 in FIG. 11) in the memory 11 (see FIG. 1) as the score information 114*b* (see FIG. 1) in association with the equipment ID.

FIG. 12 is an explanatory diagram of the score information 114*b* of equipment.

In the example of FIG. 12, a sequence of the score (0.0, 0.1, 0.2, 0.2, . . . ) in calendar date order of the equipment whose equipment ID is "Transformer1" is stored in the memory 11 (see FIG. 1) as the score information 114*b*. Note that the score information 114*b* is generated similarly for other equipment to be the future target of maintenance.

After the processing of step S1046 of FIG. 10 is performed, the processing of the plan calculation section 112*b* returns to step S1041. In this manner, the plan calculation section 112*b* performs the processing of steps S1041 to S1046 for each piece of equipment. If the scores of all pieces of equipment are calculated in step S1041 (S1041: Yes), the processing of the plan calculation section 112*b* proceeds to step S1047.

In step S1047, the plan calculation section 112*b* makes future maintenance planning for each piece of equipment. That is, the plan calculation section 112*b* makes the maintenance planning so as to maximize the sum of the score within a range of a predetermined service constraint regarding a plurality of pieces of equipment (or a plurality of maintenances). Here, the predetermined service constraint is a constraint regarding, for example, tools used for maintenance, replacement components, seasons, personnel, and the like, in addition to the implementation order of maintenance. Such data regarding the service constraint is provided from the user, for example, and stored in the memory 11 (see FIG. 1). Due to the presence of such the service constraint, it is not particularly necessary to maximize the scores of all pieces of equipment to be the target of maintenance. That is, since the sum of the scores of each piece of equipment (or each maintenances) may be maximized within the range of the predetermined service constraint, it is not particularly necessary to maximize the individual scores.

Note that regarding the processing in step S1047, the plan calculation section 112*b* may cause an external server or the like (not illustrated) to perform predetermined arithmetic processing, or dedicated software may be appropriately used.

Then, in step S1048, the plan calculation section 112*b* stores the data of the maintenance plan into the memory 11 (see FIG. 1) as the plan information 115*b* (see FIG. 1). After performing the processing of step S1048, the plan calculation section 112*b* ends the series of processing (END).

FIG. 13 is an explanatory diagram of the plan information 115*b*.

In the example of FIG. 13, data "first week of month of YY, year of XXXX" is stored as the plan information 115*b* in the memory 11 (see FIG. 1) as the maintenance time of the equipment whose equipment ID is "Transformer1". The maintenance time illustrated in FIG. 13 may be, for example, a time during which maintenance can be performed, or may be a calendar date on which maintenance is most recommended (calendar date of the best timing). In this manner, the data of the maintenance time of each piece of equipment is associated with the equipment ID (or the maintenance ID).

The display control section 11*c* illustrated in FIG. 1 causes the display device 40 (see FIG. 1) to display a setting screen (e.g., the display screens in FIGS. 5 and 9) of the user, and causes the display device 40 to display the plan information 115*b* (see FIG. 14) created by the plan calculation section 112*b*.

Figure 14:
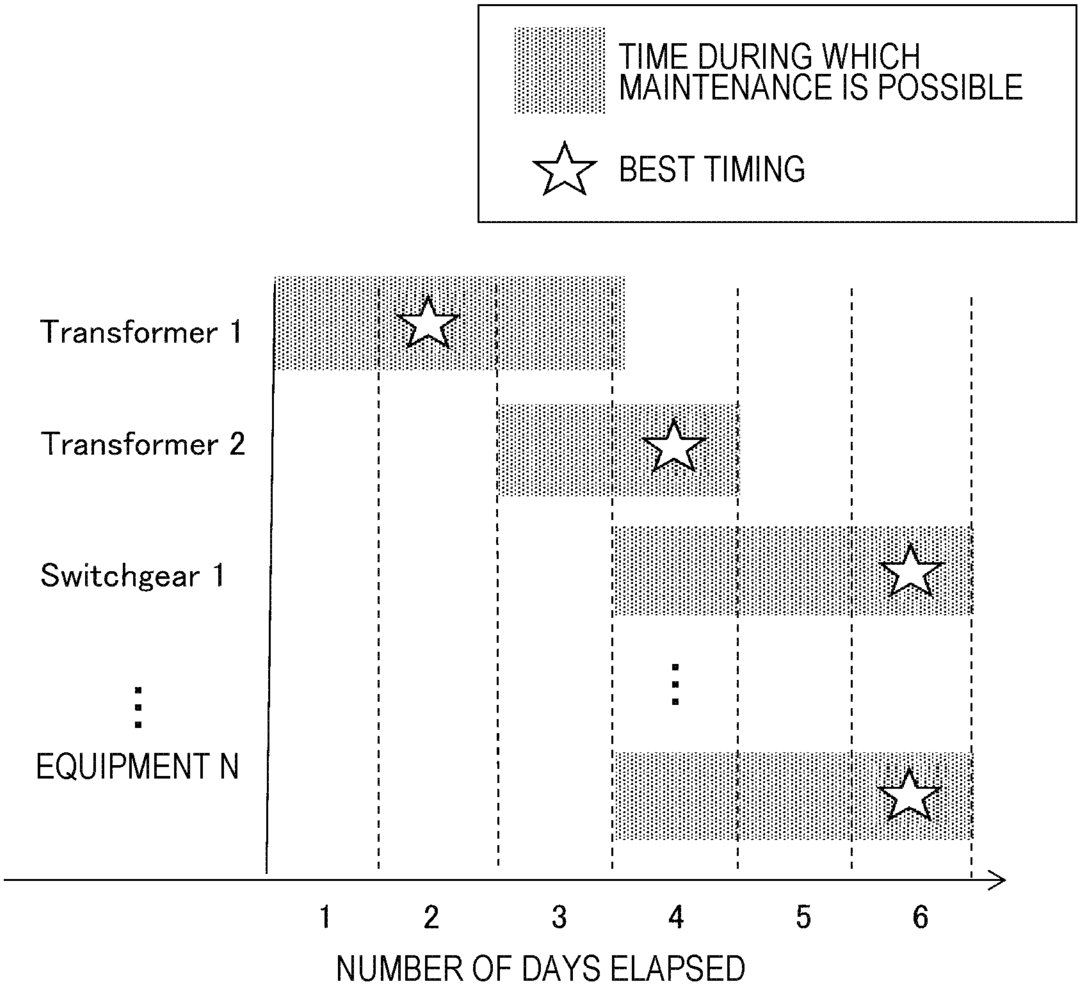
FIG. 14 is a display screen example regarding maintenance planning of each piece of equipment in the maintenance planning system according to the embodiment.

FIG. 14 is a display screen example regarding maintenance planning of each piece of equipment.

The horizontal axis in FIG. 14 represents the number of elapsed days from the current time point (time of making maintenance planning). In FIG. 14, the equipment IDs of the pieces of equipment are displayed side by side in the vertical direction. Then, the time during which the maintenance is possible (period of dot display) and the time that is the best timing of the maintenance (calendar date marked with star) are associated with the equipment ID and displayed in a table format. This enables the user to grasp, at a glance, at which timing maintenance of each piece of equipment should be performed. Note that in the example of FIG. 14, the horizontal axis represents "elapsed days", but in place of this, a predetermined calendar date (year/month/day) may be displayed.

The maintenance planning of the equipment can be made again by the user changing the curve (e.g., the curve C2 in FIG. 11) indicating the relationship between the failure risk exponent and the score. For example, the curve C2 illustrated in FIG. 11 has a relatively low failure risk exponent at the vertex T2. That is, the curve C2 reflects the user's concept of desiring to reduce the risk of failure of the equipment by performing the maintenance early.

For example, it is assumed that a user who has viewed the maintenance planning (see FIG. 14) of each piece of equipment desires to view the maintenance planning in which the cost required for maintenance is suppressed. In such a case, the user operates the input device 30 (see FIG. 1) in a predetermined manner to change the curve indicating the relationship between the failure risk exponent and the score to, for example, the curve C3 in FIG. 7. The curve C3 has a relatively high failure risk exponent at the vertex T3 and reflects the concept of suppressing the maintenance cost.

Note that the curves of the scores may be individually changed in each piece of equipment, or may be collectively changed depending on the type of equipment or the like. Then, the plan calculation section 112*b* (see FIG. 1) makes the maintenance planning of each piece of equipment again based on the curve of the score after the change of each piece of equipment. In this manner, after the maintenance planning is made, in a case where the score is readjusted based on the operation via the input device 30 (input means) by the user, the plan calculation section 112*b* makes the maintenance planning of the equipment again based on the score after the readjustment. This enables the user to confirm the maintenance plan of each piece of equipment based on the score after the readjustment, and make maintenance planning in accordance with his desire.

For example, after the maintenance planning is made, the user can change, by the operation of the input device 30, the prediction technique for predicting the transition of the future failure risk exponent of the equipment, and can make maintenance planning again based on the prediction technique after the change. This enables the user to confirm the maintenance planning based on the predetermined prediction technique selected again by the user himself/herself.

<Effects>

According to the present embodiment, the user can adjust, by the operation of the input device 30 (see FIG. 1), the score indicating appropriateness regarding the future maintenance time of the equipment. Therefore, the user's concept (preference) regarding the risk of failure of the equipment and the cost of maintenance can be reflected in the maintenance planning. This makes it easier for the user to understand and accept the result of the maintenance planning. Since the user may adjust (see FIG. 7) the shape of the predetermined curve displayed on the display device 40 (see FIG. 1), the user can easily visually understand the processing regarding the score adjustment.

According to the present embodiment, the user selects the prediction technique for predicting the future state (e.g., a failure risk exponent) of the equipment. That is, the user himself/herself can flexibly select the prediction technique in accordance with individual circumstances such as whether or not history data of maintenance of the equipment is owned. In this manner, by interposing user's selection and adjustment in the process of making the maintenance planning, the user easily accepts the maintenance planning of the equipment.

Even after a maintenance plan is created once, the user can appropriately change the prediction technique of the failure risk exponent of the equipment and the score of the maintenance time, and can make the maintenance planning again based on the data after change. Also in this case, since the user can visually understand the concept regarding maintenance, the user can appropriately correct the maintenance planning in accordance with the concept (preference) of the user.

By appropriately setting the prediction technique for predicting the future state of the equipment, it is possible to cope with a failure risk that varies with a change in season, for example. For example, in summer, trees easily grow and trees easily come into contact with power transmission lines, and a predetermined function in consideration of such a situation can also be used as a prediction technique.

<<Modifications>>

While the maintenance planning system 10 according to the present invention has been described above in the embodiment, the present invention is not limited to these descriptions, and various changes can be made.

For example, in the embodiment, a case where the failure risk exponent is used as an index indicating the future state of the equipment has been described, but the invention is not limited to this. That is, the index may indicate the future state of the equipment, and a predetermined index different from the failure risk exponent may be used.

In the embodiment, a case where the prediction technique is selected from the "exponential function", the "time-based", the "standard model-based", and the "data-driven" has been described as the prediction technique when predicting the future state of the equipment, but another prediction technique may be used.

In the embodiment, the processing of causing the setting screen to display the equipment (or maintenance) that is grouped, based on the type of equipment, the type of maintenance, or the installation location of the equipment, and collectively changing the curve of the score based on the operation by the user has been described, but the present invention is not limited to this. For example, selection of the prediction technique for predicting the future state of the equipment may be collectively changeable for each predetermined group. This can reduce the work load of the user.

In the embodiment, a case where the curve indicating the relationship between the failure risk exponent and the score is changed by the operation of the input device 30 (see FIG. 1) by the user has been described, but the present invention is not limited to this. For example, on a predetermined coordinate axis indicating the failure risk exponent, the user may be allowed to designate a position where the maximum value of the score is given, or another method may be appropriately used.

In the embodiment, in the curve (see FIG. 7) indicating the relationship between e risk exponent (failure risk value) and the score, a case where both the failure risk value of the vertex where the maximum value of the score is given in the part that is convex upward and the score of the vertex of this curve are adjusted has been described, but the present invention is not limited to this. That is, in the curve described above, at least one of the failure risk value of the vertex where the maximum value of the score is given and the score of the vertex of the curve may be adjusted.

The shape of the curve indicating the relationship between the failure risk exponent and the score may include a part that is convex downward as well as the part that is convex upward.

In the embodiment, as adjustment of the score by the user, a case where the maximum value of the failure risk value ("maximum risk value" in FIG. 8) is adjustable in the curve (see FIG. 7) indicating the relationship between the failure risk exponent (failure risk value) and the score has been described, but the present invention is not limited to this. For example, the maximum value of the failure risk value may be fixed.

In the embodiment, a case where the curve (see FIG. 7) indicating the relationship between the failure risk exponent and the score is adjusted by the operation by the user has been described, but the present invention is not limited to this. For example, a curve indicating the relationship between an elapsed time from a predetermined reference time (time of making maintenance planning or end of the most recent maintenance) and a score may be adjusted based on an operation of the input device 30 by the user.

When making the maintenance planning, the display control section 11*c* (see FIG. 1) may cause the display device 40 to display the total value of the scores of pieces of equipment (or the maintenances). This allows the plurality of maintenance plans to be used as a reference when the user compares the maintenance plans.

In a case where the user corrects a curve of a score or the like in a predetermined manner, an artificial intelligence (AI) or the like may learn the tendency of the correction and reflect the learning result when the user makes the maintenance planning again.

The processing executed by the maintenance planning system 10 may be executed as a predetermined program of a computer. The above-described program can be provided via a communication line, or can be distributed by being written in a recording medium such as a CD-ROM.

The embodiment has been described in detail in order to explain the present invention in an easy-to-understand manner, and is not necessarily limited to that including all the configurations described. Another configuration can be added to, deleted from, or replaced with a part of the configuration of the embodiment. For the mechanisms and configurations described above, those considered necessary for description are illustrated, and not necessarily all the mechanisms and configurations in the product are illustrated.

REFERENCE SIGNS LIST

10 maintenance planning system
11 memory
11*a* risk assessment section
111*a* prediction technique selection section
112*a* assessment calculation execution section
113*a* equipment information
114*a* prediction technique information
115*a* equipment state prediction information
11*b* planning section
111*b* score adjustment section
112*b* plan calculation section
113*b* plan policy information
114*b* score information
115*b* plan information
11*c* display control section
12 processor
13 interface
20 storage device
30 input device (input means)
40 display device (display means)
50 network

The invention claimed is:

1. A maintenance planning system, comprising:
- a memory configured to store a score adjustment component, a plan calculation component, and a display control component; and
- a processor operably coupled to memory and configured to:
  - execute the score adjustment component to adjust a score indicating a degree of appropriateness regarding an implementation time of future maintenance of industrial equipment based on an operation of the industrial equipment in response to user input;
  - execute the plan calculation component to make maintenance planning of the industrial equipment based on a result of adjustment by the score adjustment component;
  - execute the display control component to cause a display of the maintenance planning system to display a predetermined curve indicating a relationship between a failure risk value indicating a height of a future failure risk of the industrial equipment and the score, wherein the score adjustment component is further executed to change the curve in response to user input, and wherein the plan calculation component is further executed to calculate the failure risk value corresponding to an elapsed time from a predetermined reference time and calculate the score corresponding to the failure risk value based on the curve; and
  - cause the industrial equipment to undergo a maintenance based at least in part on the failure risk value and the score.

2. The maintenance planning system according to claim 1, wherein the processor is further configured to execute a risk assessment component to calculate a failure risk value indicating a height of a future failure risk of the industrial equipment based on a calculation technique selected in response to user input from among a plurality of calculation techniques that are candidates for calculating the failure risk value.

3. The maintenance planning system according to claim 1, wherein the processor is further configured to execute the plan calculation component to make the maintenance planning so as to maximize a sum of the score within a range of a predetermined service constraint regarding a plurality of pieces of the industrial equipment or a plurality of the maintenances.

4. The maintenance planning system according to claim 1, wherein:
- the curve includes a part that is convex upward, and
- at least one of the failure risk value of a vertex giving a maximum value of the score in the part and the score of the vertex is adjusted as the adjustment.

5. The maintenance planning system according to claim 1, wherein a maximum value of the failure risk value in the curve is adjusted as the adjustment.

6. The maintenance planning system according to claim 1, wherein, when the score is readjusted in response to user input after making the maintenance planning, and wherein the processor is further configured to execute the plan calculation component to make maintenance planning of the industrial equipment again based on the score after readjustment.

7. The maintenance planning system according to claim 1, wherein the processor is further configured to:
- execute the display control component to cause a setting screen to display the industrial equipment or the maintenances grouped based on a type of the industrial equipment, a type of the maintenance, or an installation location of the equipment, and
- the score regarding the equipment or the maintenances that are grouped is collectively adjusted in response to user input.

8. The maintenance planning system according to claim 1, wherein a third function indicating a relationship between an elapsed time and the score is derived as a composite function of a first function indicating a relationship between the elapsed time from a predetermined reference time and a failure risk value indicating a height of a future failure risk of the equipment and a second function indicating a relationship between the failure risk value and the score.

9. A maintenance planning method, comprising:

adjusting, by a processor of a maintenance planning system, a score indicating a degree of appropriateness regarding an implementation time of future maintenance of industrial equipment based on an operation of the industrial equipment in response to user input;

generating, by the processor, a maintenance planning of the industrial equipment based on a result of the adjusted score;

causing, by the processor, a display of the maintenance planning system to display a predetermined curve indicating a relationship between a failure risk value indicating a height of a future failure risk of the industrial equipment and the score;

changing, by the processor, the curve in response to user input;

calculating, by the processor, the failure risk value corresponding to an elapsed time from a predetermined reference time;

calculating, by the processor, the score corresponding to the failure risk value based on the curve; and causing, by the processor, the industrial equipment to undergo a maintenance based at least in part on the failure risk value and the score.

* * * * *